J. W. FLEISCHMANN.
GLASSES FOR PICTURE-FRAMES.

No. 192,365. Patented June 26, 1877.

UNITED STATES PATENT OFFICE.

JULIUS W. FLEISCHMANN, OF WILLIAMSBURG, NEW YORK.

IMPROVEMENT IN GLASSES FOR PICTURE-FRAMES.

Specification forming part of Letters Patent No. 192,365, dated June 26, 1877; application filed May 31, 1877.

*To all whom it may concern:*

Be it known that I, JULIUS W. FLEISCHMANN, of Williamsburg, in the county of Kings and State of New York, have invented certain new and useful Improvements in Glass for Picture-Frames; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to that class of convex glasses commonly used for framing purposes; and it further consists in providing said glasses with a straight flange or rim, extending partially or entirely around the glass, as will hereinafter be more fully described.

Figure 1:
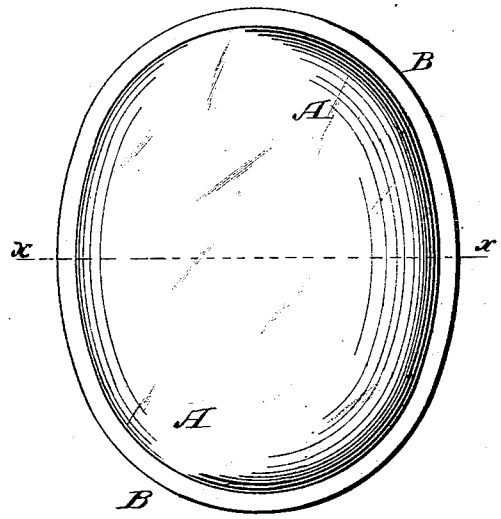
Figure 2:
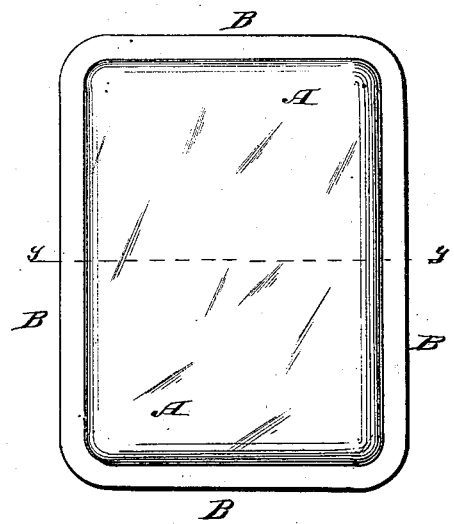
Figure 3:
Figure 4:
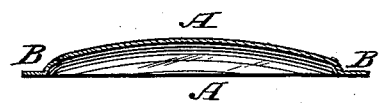

In the annexed drawing, which fully illustrates my invention, Figure 1 is a plan view of one of my improved glasses. Fig. 2 is a similar view in a modified form. Fig. 3 is a central vertical section on line $x\,x$, Fig. 1; and Fig. 4 is a similar section taken on line $y\,y$, Fig. 2.

A represents a transparent convex glass, which may be made of any desired shape or form. This glass is provided on the outside, and extending all around it, with a straight rim or flange, B. This flange will come directly under the mat or frame of a picture when the glass is in position or framed. The object of providing this rim or flange B is for the purpose of better or more fully setting off the edge of the convexity when framed, this object not being accomplished by the glasses now in use, as they are not provided with the flange, and, consequently, do not show the edge well when framed.

By making the rim or flange B straight it presents a flat surface between the frame and the picture, and so, consequently, renders it less liable to breakage.

If desired, said flange or rim may extend all or only partly around the glass, as it would readily answer the same purposes by having it only at the corners or in the middle of each side of the glass.

Having thus fully described my invention, what I claim as new, and desire to secure by Letters Patent, is—

A convex glass for picture-frames, provided at its outer edge with a straight rim or flange, substantially as and for the purposes herein set forth.

In testimony that I claim the foregoing as my own I have hereto affixed my signature in presence of two witnesses.

JULIUS W. FLEISCHMANN.

Witnesses:
G. S. HARDING,
R. H. HARDING.